(12) United States Patent
Hidalgo et al.

(10) Patent No.: US 8,492,495 B2
(45) Date of Patent: Jul. 23, 2013

(54) POLYMERIC ADDITIVES OBTAINED BY SALIFICATION OF COPOLYMERS

(75) Inventors: Manuel Hidalgo, Brignais (FR); Sandra Grimaldi, Sainte-Foy-les-Lyon (FR)

(73) Assignee: Arkema France, Colombes (FR)

( * ) Notice: Subject to any disclaimer, the term of this patent is extended or adjusted under 35 U.S.C. 154(b) by 227 days.

(21) Appl. No.: 12/810,037

(22) PCT Filed: Dec. 9, 2008

(86) PCT No.: PCT/EP2008/067129
§ 371 (c)(1),
(2), (4) Date: Jun. 22, 2010

(87) PCT Pub. No.: WO2009/080499
PCT Pub. Date: Jul. 2, 2009

(65) Prior Publication Data
US 2010/0273965 A1    Oct. 28, 2010

(30) Foreign Application Priority Data
Dec. 24, 2007 (FR) ..................... 07 60342

(51) Int. Cl.
*C08F 2/00* (2006.01)
*C08L 51/00* (2006.01)

(52) U.S. Cl.
USPC ........................... 526/204; 525/66

(58) Field of Classification Search
USPC ....................................... 524/204
See application file for complete search history.

(56) References Cited

U.S. PATENT DOCUMENTS

| | | | |
|---|---|---|---|
| 2,971,939 A | 2/1961 | Baer | |
| 2,980,652 A * | 4/1961 | Melamed et al. | 526/262 |
| 3,363,029 A | 1/1968 | Verdol | |
| 3,444,151 A * | 5/1969 | Gonzalez et al. | 526/203 |
| 3,732,334 A | 5/1973 | Koch | |
| 4,381,367 A * | 4/1983 | von Bonin et al. | 524/549 |
| 4,831,367 A | 5/1989 | Baus | |
| 4,868,259 A | 9/1989 | Burroway | |
| 5,115,018 A | 5/1992 | Akkapeddi | |
| 5,270,399 A * | 12/1993 | Czornij et al. | 525/327.6 |
| 5,290,849 A | 3/1994 | Lee | |
| 5,650,263 A | 7/1997 | Wakata | |
| 5,659,348 A * | 8/1997 | Malhotra | 347/105 |
| 6,063,184 A | 5/2000 | Leikauf | |
| 2002/0069989 A1 | 6/2002 | Feret | |
| 2004/0024127 A1 | 2/2004 | Baumert | |
| 2004/0054037 A1 | 3/2004 | Abbeele van den | |
| 2007/0117909 A1 | 5/2007 | Seliskar | |
| 2008/0220271 A1 | 9/2008 | Baumert | |

FOREIGN PATENT DOCUMENTS

| | | |
|---|---|---|
| EP | 0393899 A | 10/1990 |
| EP | 0412832 A | 2/1991 |
| EP | 0810323 A2 | 12/1997 |
| EP | 1342764 A2 | 9/2003 |
| GB | 1053791 A | 1/1967 |
| WO | 0248459 A2 | 6/2002 |
| WO | 2006056690 A | 6/2006 |
| WO | 2006085007 A1 | 8/2006 |

OTHER PUBLICATIONS

International Search Report issued in PCT/EP2008/067129 filed Dec. 9, 2008, mailed Mar. 11, 2009.
Written Opinion of the International Searching Authority issued for PCT/EP2008/067129, on Jun. 29, 2010.

\* cited by examiner

*Primary Examiner* — Hui Chin
(74) *Attorney, Agent, or Firm* — RatnerPrestia

(57) ABSTRACT

The present invention relates to a salified copolymer that can be obtained by salification, in an aqueous medium, using at least one amine containing at least one nitrogenous heterocyclic group, of a copolymer obtained from at least one cyclic anhydride-based or carboxylic acid-based monomer and from at least one styrene-based monomer, such as a styrene/maleic anhydride (SMA) copolymer. It also relates to the process for producing this salified copolymer, to a composition containing same, and also to the use of this composition for surface-treating, in particular coating, sizing and finishing, paper or cardboard.

19 Claims, 1 Drawing Sheet

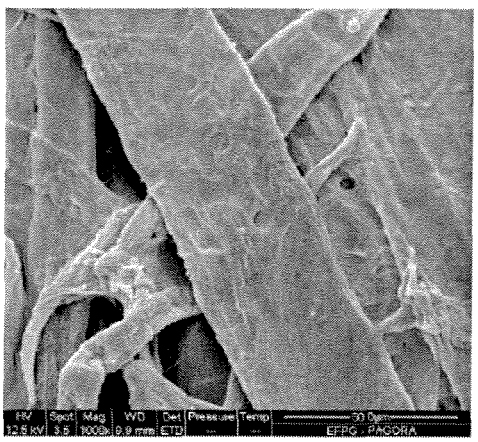 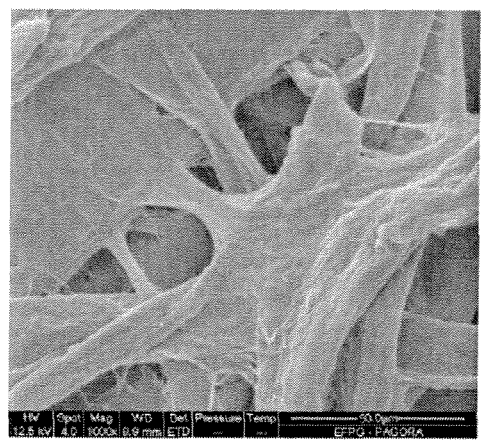
SINGLE FIGURE

POLYMERIC ADDITIVES OBTAINED BY SALIFICATION OF COPOLYMERS

The present invention relates to new polymeric additives based on styrene units and on carboxylic acid or anhydride units. It also relates to the compositions comprising them and to the uses thereof, in particular in the paper-making field.

A very large proportion of printing/writing papers and cardboards currently commercially available are coated. This expression is intended to mean that they are coated, on one of their faces or on both, with a coating intended to smooth their surface, to improve the whiteness of the paper and to confer thereon particular surface effects (in particular a sheen) and also a pleasant feel. The coating slip usually contains a majority of fine pigments with which various additives are combined.

Styrene/maleic anhydride copolymers are known for being used in the coating of paper, as additives for improving the properties of the paper, such as its hydrophobicity, its water resistance, its printability or its surface appearance. These additives are often used as ingredients in liquid compositions for sizing or coating the paper, of which they can also favourably modify the rheology by contributing to reducing the viscosity, in particular at high shear, or by contributing to increasing the concentration of fillers or of pigments. These liquid compositions used for treating paper during the manufacture thereof and which may contain polymer additives based on styrene and anhydride units, are aqueous suspensions of fillers or of pigments that may also contain a binder and other additives.

Thus, document WO 02/48459 describes paper-coating compositions comprising a highly branched polyester amide, of Hybrane® type, optionally combined with a styrene/maleic anhydride (SMA) polymer or with a salt thereof, for reducing the viscosity of the coating composition while at the same time forming a flexible and resistant film which adheres well to the paper and which dries rapidly.

It is common practice to use, as salts of the styrene/maleic anhydride copolymers, inorganic or organic bases, and in particular amines, with a view to promoting the solubilization thereof in water. Document U.S. Pat. No. 5,290,849 thus describes a paper-sizing composition comprising an ammonium salt of a styrene/maleic anhydride/alkyl methacrylate terpolymer.

Moreover, document U.S. Pat. No. 4,831,367 describes paper-sizing agents resulting from the salification, with epichlorohydrin or with organic or inorganic acids, of the product of reacting styrene/maleic anhydride copolymers with bases such as morpholine, pyridine or piperidine derivatives.

Nevertheless, there remains the need to have a new additive for coating or sizing paper, which exhibits at least one of the following benefits compared with the similar prior art compositions:
- a greater hydrophobicity,
- a better dispersion of the pigments and/or fillers used in the manufacture of the paper,
- a better water retention, defined as the ability of the composition to keep water in contact with the binder and the fillers or pigments,
- a better compatibility with the cellulose fibres used in the manufacture of the paper,
- a better adhesion to the paper after drying,
- a shorter drying time,
- a more ready formation of a film on the paper, and/or
- a better resistance and/or flexibility of the film formed.

As a variant or in addition, it will be desirable to have a new additive which confers on the coated paper or cardboard, coated with a composition containing this additive, at least one of the following benefits compared with the similar prior art compositions:
- a better printability,
- a higher printing resolution,
- a better colour rendering,
- a greater mechanical strength, and/or
- an improved feel.

A subject of the present invention is therefore a salified copolymer that can be obtained by salification, in an aqueous medium, using at least one amine containing at least one nitrogenous heterocyclic group, of a copolymer obtained from at least one cyclic anhydride-based or carboxylic acid-based monomer and from at least one styrene-based monomer.

A subject of the present invention is also a process for the salification, in an aqueous medium, of a copolymer obtained from at least one cyclic anhydride-based or carboxylic acid-based monomer and from at least one styrene-based monomer, comprising bringing said copolymer into contact with at least one amine containing at least one nitrogenous heterocyclic group.

The salification of the copolymer is carried out according to the invention by using an amine comprising at least one nitrogenous heterocyclic group, corresponding to any one of the following formulae (1) to (6):

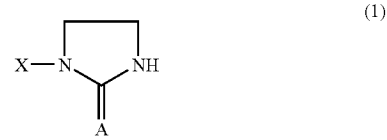

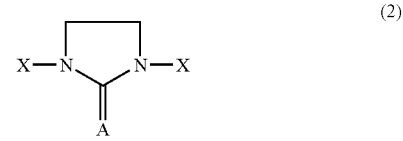

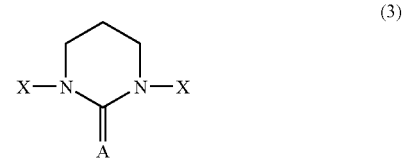

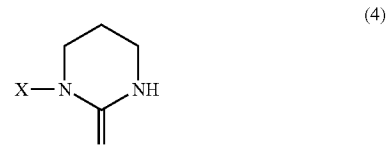

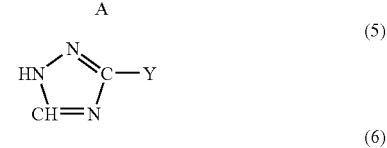

where A denotes an oxygen or sulphur atom or an NH group, preferably an oxygen atom, and X, Y and R each denote any chain terminated with a primary or secondary amine function.

According to one preferred embodiment of the invention, the nitrogenous heterocycle comprises an imidazolidone group.

In addition, X, Y and R preferably each independently represent a rigid or flexible chain, terminated with a primary or secondary amine group, constituted of from 1 to 30 carbon atoms, at least some of which may be substituted, and optionally of one or more heteroatoms, chosen in particular from sulphur, oxygen and nitrogen, said chain optionally containing one or more ester or amide bridges. Preferably, X, Y and R each independently denote a linear or branched $C_1$-$C_{10}$ alkylene chain, optionally interrupted with one or more nitrogen atoms and bearing a primary or secondary amine end function.

According to one particularly preferred embodiment of the invention, the chain X is a linear $C_1$-$C_6$ alkylene chain bearing a primary or secondary amine end function.

As a variant, and according to another preferred embodiment of the invention, the chains Y and R denote a primary or secondary amine group.

Preferred examples of amines of formulae (1) to (6) are 1-(2-aminoethyl)imidazolidin-2-one (UDETA), 1-(2-[(2-aminoethyl)amino]ethyl)imidazolidone (UTETA), 1-[(2-{[(2-aminoethyl)amino]ethyl}amino)ethyl]imidazolidone (UTEPA), 3-amino-1H-1,2,4-triazole (3-ATA) and 4-amino-1H-1,2,4-triazole (4-ATA). UDETA is preferred for use in the present invention. According to another embodiment, the amine may be 3-ATA.

BRIEF DESCRIPTION OF THE DRAWINGS

FIG. 1 shows two photographs obtained by scanning electron microscopy (SEM) at a magnification of 1000×, of the surface of the control sheet (no additive), on the left, and of the sheet impregnated with the additive solution, on the right. The additive, due to the good affinity thereof with the paper, appears to create bridges between the fibres.

The amines used according to the invention may be derived from the reaction of urea with at least one compound chosen from alkylene amines and amines. Thus, the UDETA may be prepared by reacting urea with diethylene triamine (DETA).

For the purpose of the present invention, the term "aqueous medium" is intended to mean a medium containing water and optionally one or more water-miscible organic solvents, such as acetone, methanol, ethanol, glycerol, ethylene glycol or diethylene glycol, without this list being limiting.

For the purpose of the present invention, the expression "cyclic anhydride-based or carboxylic acid-based monomers" is intended to mean monomers comprising, or consisting of, cyclic anhydride or carboxylic acid units, respectively. Similarly, for the purpose of the present invention, the term "styrene-based monomers" is intended to mean monomers comprising, or consisting of, styrene units. An example of a styrene-based monomer is α-methylstyrene.

It is understood, moreover, that, in addition to the above monomers, the copolymer used according to the invention may be prepared from additional monomers, such as alkyl (meth)acrylates. However, it is preferred for this copolymer to be produced only from the above monomers.

In addition, the salified copolymer according to the invention may be linked to other polymers, in particular elastomeric polymers, by at least one covalent bond.

The styrene-based monomer is preferably styrene or α-methylstyrene.

In addition, the cyclic anhydride-based monomers that are suitable for the production of this copolymer comprise in particular those chosen from: maleic anhydride, itaconic anhydride, acrylic anhydride and methacrylic anhydride. Maleic anhydride is preferred for use in the present invention.

As examples of carboxylic acid-based monomers, mention may be made of those chosen from: acrylic acid, methacrylic acid and itaconic acid.

The salified copolymer according to the invention may be obtained from any copolymer as defined above, and preferably from a copolymer containing only styrene or α-methylstyrene units and maleic anhydride units (or SMA copolymer), or else from a copolymer containing only styrene or α-methylstyrene units and (meth)acrylic acid units. This copolymer may have a weight-average molecular mass (Mw) ranging from 500 to 500 000 Da, preferably from 1000 to 200 000 Da, and more preferentially from 2000 to 50 000 Da. An example of a copolymer that can be used according to the invention is available from the company Sartomer under the trade name Sartomer® SMA 1000.

This copolymer may contain from 0.5% to 70% by weight of cyclic anhydride-based or carboxylic acid-based monomers, relative to the total weight of the monomers involved. In addition, the molar ratio of the styrene-based monomers to the cyclic anhydride-based or carboxylic acid-based monomers may range from 0.5:1 to 29:1, and preferably from 0.6:1 to 6:1.

The molar ratio of the amine comprising at least one nitrogenous heterocyclic group to the cyclic anhydride or carboxylic acid units of the copolymer may range from 0.01 to 10, and preferably from 0.05 to 2.

The copolymer salification step may be carried out by adding the amine, with stirring, to all or part of the aqueous medium containing the copolymer, for a period ranging from a few minutes to a few hours, for example from 5 minutes to 6 hours, at a temperature that may range from 70 to 95° C. The amine may be introduced continuously or batchwise, for example in a single step, with the proviso that the exothermicity brought about by the salification reaction is controlled. As a variant, this salification step may be carried out by adding the copolymer, with stirring, to all or part of the aqueous medium containing the amine, under the conditions mentioned above. The copolymer may be introduced continuously or batchwise, optionally in a single step. As a further variant, it is possible to simultaneously introduce the amine and the copolymer continuously into all or part of the aqueous medium.

Moreover, the salified copolymer according to the invention is preferably not subjected to chemical modifications other than the abovementioned salification, and in particular to a salification and/or reaction with other organic or inorganic bases or acids, before being used according to the invention.

The copolymer may optionally be ground before being brought into contact with the amine. It may, for example, subsequently be introduced, into the aqueous medium, in a proportion of from 10% to 20% by weight.

The reaction of the amine with the copolymer results in opening of the cyclic anhydride units when they are present, and salification of at least some of the resulting acid groups by the aminated base. Although the acid-base salification reaction is desired, it is not out of the question for some of the acid groups to react, in addition to this acid-base reaction, with the amine so as to form amide-type covalent bonds, and for the resulting amide functions to themselves be able to react with a neighbouring carboxylic acid function so as to form imide bonds. The product obtained according to the salification process described above may thus comprise nitrogenous heterocycles linked to the backbone of the copolymer both by ionic bonds and by covalent bonds.

A subject of the invention is also a composition containing at least one salified copolymer as described above, advantageously in an aqueous medium.

This composition may comprise various additives chosen, for example, from: pigments such as calcium carbonate, talc, kaolin, bentonite and titanium dioxide; dyes; binders such as maize or wheat starch, plant proteins, styrene/butadiene copolymers, versatate polymers, styrene/acrylic copolymers and vinyl acetate homopolymers and copolymers; dispersing agents such as fatty acid soaps and poly(acrylic acid) derivatives; agents for increasing hydrophobicity, such as waxes; preservatives; viscosity modifiers, such as starches, cellulose derivatives and soya bean proteins; and mixtures thereof.

It may have a pH ranging, for example, from 5 to 13.

The composition according to the invention may be used for the surface treatment of paper or cardboard, in particular for sizing, coating or finishing paper, especially with a view to applying to said paper a coating for facilitating printing thereon, conferring on said paper better resistance to fats or to water or to other substances, etc.

A subject of the present invention is therefore also the use of the composition described above, for surface-treating, in particular coating, sizing or finishing, paper or cardboard.

As a variant, the salified copolymer described above may be used as a polymer surfactant, in particular for stabilizing polymerizations in a dispersed medium, such as direct and inverse emulsion polymerization (conventional, mini emulsion, micro emulsion), direct and inverse suspension polymerization, and dispersion or precipitation polymerization. See chapter 7 of the book *Les latex synthétiques. Elaboration-Propriétés-Applications* [Synthetic latices. Production-Properties-Applications] coordinated by Jean-Claude Daniel and Christian Pichot, published by Tec&Doc Lavoisier 2006 ISBN 2-7430-0741-9, for a description of the various types of polymerizations in a dispersed medium.

The novel salified copolymer of the invention is also of use as a dispersing agent for pigments, in particular in ink formulations, as an aid to the milling of pigments or as a cosurfactant in the emulsion-polymerization synthesis of acrylic binders for aqueous ink formulations.

The novel salified copolymer of the invention is also of use as a dispersing agent for inorganic fillers such as calcium carbonate, kaolin, titanium dioxide or cement, in formulations used in paints, varnishes and other coatings, in the production of filled paper sheets, and in grouts, mortars and concretes.

The novel salified copolymer of the invention is also useful as a base for the production of coatings for floors, where it gives a sheen and adherence to the floors, in particular on tiled floors, and mechanical strength of the coating film formed.

The invention will be understood more clearly in light of the following examples, given for illustration purposes only, and which are not intended to restrict the scope of the invention, defined by the attached claims.

EXAMPLES

Example 1

Salification of an SMA Copolymer in Water with UDETA (Slight Molar Excess Relative to the Neutralization of the Acid Groups)

The SMA copolymer before salification is a Sartomer SMA 1000 F product comprising a molar ratio of styrene:maleic anhydride units of 1:1. Granules of SMA 1000 F are ground in a mortar or in a mill so as to have a fine powder, and 40 g of this powder are dispersed with stirring in 360 g of demineralized water in a glass reactor comprising a heating/cooling jacket, a variable-speed stirrer, lines for introducing temperature probes and for optionally introducing a gas such as nitrogen, and a reflux condensation system for limiting water losses during heating. The SMA is not soluble in demineralized water at ambient temperature and, therefore, a suspension of SMA powder in water is initially obtained. The temperature of the reactor is subsequently brought to 90° C. and 134 g of an aqueous solution containing 38% by weight of UDETA amine with a purity of greater than 80% by weight are added in 20 minutes, which corresponds to an addition of 51.3 g of UDETA amine. The medium is maintained at 90° C. for 5 hours, the temperature is then decreased and the reactor is emptied at 45° C. The resulting product is a slightly cloudy solution of SMA salified with UDETA, of pH 9.6 and containing 16.5% of dry extract.

Example 2

Evaluation of the Properties of a Salified Copolymer According to the Invention

With the aim of determining the surfactant properties of dilute aqueous solutions of the salified copolymer of example 1, an aqueous solution in demineralized water is prepared, containing 1% by weight of this salified copolymer. This solution is filtered with a 0.8 μm filter. Solutions at 0.1%, 0.05%, 0.01% and 0.001% by weight are subsequently prepared by successive dilution of the filtered 1% solution. The surface tensions of these solutions are measured using a Tracker® drop tensiometer device, controlled by Windrop® software with a needle 20 μm in diameter. Table 1 gives the result of the measurements carried out.

TABLE 1

| Conc (%) | 0.0010 | 0.010 | 0.050 | 0.10 | 1.0 |
|---|---|---|---|---|---|
| Tension (mN/m) | 70.5 | 70.1 | 56 | 53 | 45.5 |

It emerges from this table that the salified copolymer of example 1 exhibits surfactant properties associated with an amphiphilic nature. It may therefore be useful for conferring a certain hydrophobicity on sheets of paper or cardboard while at the same time making it possible, by virtue of its hydrophilic part, to disperse the fillers and pigments well and having a good affinity with the (hydrophilic) cellulose fibres constituting the paper.

Moreover, its surfactant nature makes it possible to envisage its use as a stabilizer or costabilizer for emulsions or suspensions of latex.

Example 3

Salification of an SMA Copolymer in Water with UDETA (Stoichiometric Ratio for Half-Neutralization of the Acid Groups)

The SMA copolymer before salification is a Sartomer SMA 1000 product comprising a ratio of styrene:maleic anhydride units of 1:1. Granules of SMA 1000 are ground in a mortar or in a mill so as to have a fine powder, and 40 g of this powder are dispersed with stirring in 360 g of demineralized water in a glass reactor comprising a heating/cooling jacket, a variable-speed stirrer, lines for introducing temperature probes and for optionally introducing a gas such as nitrogen, and a reflux condensation system for limiting water losses during heating. The SMA is not soluble at ambient temperature and, therefore, a suspension of SMA powder in water is initially obtained. The temperature of the reactor is subsequently brought to 91° C. and 60.4 g of an aqueous solution containing 38% by weight of UDETA amine with a purity of greater than 80% by weight are added in 12 minutes, which corresponds to an addition of 23 g of UDETA amine. The medium is maintained at 91° C. for 5.5 hours, the temperature is then decreased and the reactor is emptied at 45° C. The resulting product is a slightly cloudy solution of SMA salified with UDETA, with a pH of 5.5 and containing 12.9% of dry extract.

Example 4

Evaluation of the Properties of a Salified Copolymer According to the Invention

As in example 2, surface tension measurements were carried out at various concentrations of the salified result of these measurements.

TABLE 2

| Conc (%) | 0.0010 | 0.010 | 0.045 | 0.10 | 1.0 |
|---|---|---|---|---|---|
| Tension (mN/m) | 69.5 | 69.45 | 65 | 60 | 46.7 |

It emerges from this table that the salified copolymer of example 3 exhibits surfactant properties associated with an amphiphilic nature. It may therefore be useful for conferring a certain hydrophobicity on sheets of paper or cardboard while at the same time making it possible, by virtue of its hydrophilic part, to disperse the fillers and pigments well and having a good affinity with the (hydrophilic) cellulose fibres constituting the paper.

Moreover, its surfactant nature makes it possible to envisage its use as a stabilizer or costabilizer for emulsions or suspensions of latex.

Example 5

Salification of an SMA Copolymer in Water with UDETA (Intermediate Level Between Half-Neutralization and Complete Neutralization of the Acid Groups)

The SMA copolymer before salification is a Sartomer SMA 1000 product comprising a ratio of styrene:maleic anhydride units of 1:1. Granules of SMA 1000 are ground in a mortar or in a mill so as to have a fine powder, and 40 g of this powder are dispersed with stirring in 360 g of demineralized water in a glass reactor comprising heating/cooling jacket, a variable-speed stirrer, lines for introducing temperature probes and for optionally introducing a gas such as nitrogen, and a reflux condensation system for limiting water losses during heating. The SMA is not soluble at ambient temperature and, therefore, a suspension of SMA powder in water is initially obtained. The temperature of the reactor is subsequently brought to 91° C. and 83.4 g of an aqueous solution containing 40% by weight of UDETA amine with a purity of greater than 80% by weight are added in 10 minutes, which corresponds to an addition of 33.6 g of UDETA amine. The medium is maintained at 91° C. for 5.25 hours, the temperature is then decreased and the reactor is emptied at 45° C. The resulting product is a slightly cloudy solution of SMA salified with UDETA, with a pH of 7.7 and containing 15% of dry extract.

Example 6

Evaluation of the Properties of a Salified Copolymer According to the Invention

As in example 2, surface tension measurements were carried out at various concentrations of the salified copolymer of example 5. Table 3 gives the result of these measurements.

TABLE 3

| Conc (%) | 0.0011 | 0.011 | 0.051 | 0.11 | 0.221 | 0.544 | 1.1 |
|---|---|---|---|---|---|---|---|
| Tension (mN/m) | 69.9 | 69.8 | 60 | 55 | 51.5 | 48 | 47.2 |

It emerges from this table that the salified copolymer of example 5 exhibits surfactant properties associated with an amphiphilic nature. It may therefore be useful for conferring a certain hydrophobicity on sheets of paper or cardboard while at the same time making it possible, by virtue of its hydrophilic part, to disperse the fillers and pigments well and having a good affinity with the (hydrophilic) cellulose fibres constituting the paper.

Moreover, its surfactant nature makes it possible to envisage its use as a stabilizer or costabilizer for emulsions or suspensions of latex.

Example 7

Salification of a Styrene, Methacrylic Acid and Acrylic Acid Copolymer in Water with UDETA 2 kg of a latex, a stable colloidal suspension of particles of polymer with a milky appearance, comprising a styrene (40 mol %)/methacrylic acid (50 mol %)/acrylic acid (10 mol %) copolymer, are introduced into a glass reactor comprising a heating/cooling jacket, a variable-speed stirrer, lines for introducing temperature probes and for optionally introducing a gas such as nitrogen, and a reflux condensation system for limiting water losses during heating. The total number of moles of acid is 1.48. The reactor is heated to 90° C. with stirring. At the temperature of 90°, 1100 g of a solution containing 25% by weight of UDETA amine with a purity close to 80% by weight are added by means of a metering pump over 30 minutes, after which time the system is left at 90° C. for 5 hours. After cooling, the resulting product is a transparent yellow solution containing 25% of dry extract. The resulting solution foams with vigorous stirring, thereby demonstrating the surfactant capacity of the salified copolymer obtained.

Example 8

Observation by Scanning Electron Microscopy of the Affinity of a Salified Copolymer According to the Invention for Paper Fibres Sheets of filter paper treated so as to make it moisture-resistant are impregnated by soaking in an aqueous solution of a salified SMA copolymer prepared according to example 1. The paper used has the following characteristics: weight 58.3 g/m²; specific volume 2.14 cm³/g; thickness 125 μm; internal cohesion 256 J/m². The solution of salified SMA copolymer of example 1 is pre-diluted so as to achieve a concentration by weight of 5% of salified SMA copolymer. The sheets of paper are soaked in the solution for a few minutes, removed from the impregnating bath and air-dried. The dried sheets are subsequently conditioned at constant temperature and humidity (typically 23° C. at 50% humidity) for at least half a day. By way of control, a sheet of filter paper simply soaked in water, without additive, is subsequently dried and conditioned.

As a result of the impregnation, the properties of the control sheet (no additive) and of the sheet impregnated with the salified SMA copolymer are modified as indicated in table 4 below.

TABLE 4

|  | Control sheet | Sheet with additive |
|---|---|---|
| Weight | 58.3 g/m² | 64 g/m² |
| Specific volume | 2.23 cm³/g | 2.15 cm³/g |
| Thickness | 130 μm | 137 μm |

The attached FIGURE illustrates, in addition, two photographs obtained by scanning electron microscopy (SEM) at a magnification of 1000×, of the surface of the control sheet (no additive), on the left, and of the sheet impregnated with the additive solution, on the right. The additive, due to the good affinity thereof with the paper, appears to create bridges between the fibres.

Example 9

Preparation of Sheets of Paper (Handsheets) in the Presence of a Cationic Retention Agent and of the Salified Copolymers According to the Invention In this example, the polymer additives of the invention are added during the manufacture of the paper (handsheets), in the presence of a cationic polymer used as a retention agent for promoting, on this one hand, the formation of the solid "mat" of fibres and, on the other hand, the retention of the additives by this "mat" which will become the sheet of paper. The use of such retention agents is known to those skilled in the art. A polyDADMAC or poly(diallyl dimethyl ammonium chloride), of molecular mass close to 100 000 daltons, was used. For the manufacture of the handsheets, the papermaking pulp used was a pulp Valley-beaten to 35° SR, composed of 50% of hardwood fibres and 50% of softwood fibres.

The method for preparing the sheets in the form of handsheets is the following: a 2-liter sample of pulp at 10 μl is taken; 2) it is stirred for 1 minute, and then the selected amount of poly-DADMAC is added, and the mixture is stirred for a further 2 minutes; 3) the mixture is left to stand for 5 minutes; 4) it is stirred for 1 minute, and then the selected amount of salified copolymer of the invention is added and the mixture is then stirred for a further 2 minutes; 5) the mixture is left to stand for 5 minutes; 6) the preparation is diluted to 2 g/l of solids; 7) the handsheets are manufactured. The manufacture of handsheets is an operation known to those skilled in the art which involves passing the suspension of pulp over a bed which will act as a support for the "mat" of fibres and additives while at the same time allowing most of the water from the pulp to pass through. This "mat" constitutes the sheet of paper after pressing in the handsheet machine. Once manufactured, the handsheets (wet sheets of paper) are dried for 4 minutes in a Franck dryer at 80° C. and under vacuum, so as to give the final sheets of paper.

Sheets containing various amounts of polyDADMAC and of salified copolymers of examples 1 and 7 were prepared. As controls, sheets with no additive and sheets containing only the polyDADMAC were also prepared. Internal cohesion tests were carried out on these sheets, said tests reflecting the sheet delamination energy. This delamination energy is measured by pressing the sheets for 60 seconds at a pressure of 13.8 bar, and the result is given in Joules/m². Table 5 summarizes the results obtained.

TABLE 5

Internal cohesion values (J/m2)

| Series 1 | Series 2 | Series 3 |
|---|---|---|
| Reference pulp without additives: 600 | Reference pulp without additives: 557 | Reference pulp without additives: 557 |
| Pulp + 0.4% polyDADMAC + 0.3% salified copolymer of example 1: 800 | Pulp + 0.4% polyDADMAC + 0.3% salified copolymer of example 7: 650 | Pulp + 0.4% polyDADMAC: 576 |
| Pulp + 1% polyDADMAC + 4% salified copolymer of example 1: 1100 | Pulp + 1% polyDADMAC + 4% salified copolymer of example 7: 1078 | Pulp + 1% polyDADMAC: 564 |

These results clearly show a considerable effect of the salified copolymers according to the invention on the cohesion of the paper, it being impossible to attribute this to the polyDADMAC, which has virtually no effect on this property.

The results of examples 8 and 9 show good affinity of the paper with copolymers salified with an amine (UDETA) bearing an associative nitrogenous heterocycle group of imidazolidone type. This good affinity is reflected by a considerable strengthening of the cohesion of the paper, which, unexpectedly, cannot be obtained with conventional additives, such as the customary SMAs and copolymers of styrene and unsaturated carboxylic monomers.

The invention claimed is:

1. A salified copolymer obtained by salification, in an aqueous medium, using at least one amine containing at least one nitrogenous heterocyclic group, of a copolymer obtained from at least one cyclic anhydride-based or carboxylic acid-based monomer and from at least one styrene-based monomer, wherein the amine corresponds to any one of the following formulae (1) to (6):

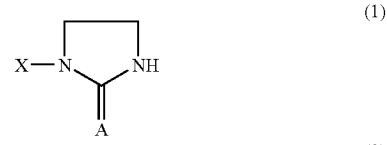

(1)

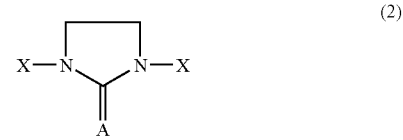

(2)

-continued

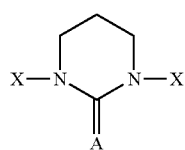
(3)

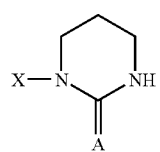
(4)

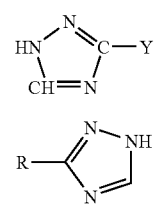
(5)

(6)

where A denotes an oxygen or sulphur atom or an NH group, X denotes a linear or branched $C_1$-$C_{10}$ alkylene chain, optionally interrupted with one or more nitrogen atoms, and terminated with a primary or secondary amine function, and Y and R each denote any chain terminated with a primary or secondary amine function, and wherein the salified copolymer comprises nitrogen heterocycles derived from the amine linked to the backbone of the copolymer by ionic bonds.

2. The copolymer according to claim 1, wherein the cyclic anhydride-based monomer is selected from the group consisting of: maleic anhydride, itaconic anhydride, acrylic anhydride and methacrylic anhydride.

3. The copolymer according to claim 2, wherein the cyclic anhydride-based copolymer is maleic anhydride.

4. The copolymer according to claim 1, wherein the carboxylic acid-based monomer is selected from the group consisting of: acrylic acid, methacrylic acid and itaconic acid.

5. The copolymer according to claim 1, wherein the styrene-based monomer is styrene or α-methylstyrene.

6. The copolymer according to claim 1, wherein said copolymer contains only styrene or α-methylstyrene units and maleic anhydride units.

7. The copolymer according to claim 1, wherein said copolymer contains only styrene or α-methylstyrene units and (meth)acrylic acid units.

8. The copolymer according to claim 1, wherein the molar ratio of the styrene-based monomers to the cyclic anhydride-based or carboxylic acid-based monomers ranges from 0.5:1 to 29:1.

9. The copolymer according to claim 1, wherein X, Y and R each independently denote a linear or branched $C_1$-$C_{10}$ alkylene chain, optionally interrupted with one or more nitrogen atoms and optionally bearing a primary or secondary amine end function.

10. The copolymer according to claim 9, wherein X denotes a linear $C_1$-$C_6$ alkylene chain bearing a primary or secondary amine end function.

11. The copolymer according to claim 1, wherein the chains Y and R denote a primary or secondary amine group.

12. The copolymer according to claim 1, wherein the amine is chosen from: 1-(2-aminoethyl)imidazolidin-2-one (UDETA), 1-(2-[(2-aminoethyl)amino]ethyl)imidazolidone (UTETA), 1-[(2-{2-[(2-aminoethyl)amino]ethyl}amino) ethyl]imidazolidone (UTEPA), and 3-amino-1H-1,2,4-triazole (3-ATA) and 4-amino-1H-1,2,4-triazole (4-ATA).

13. The copolymer according to claim 1, wherein the molar ratio of the amine comprising at least one nitrogenous heterocyclic group to the cyclic anhydride or carboxylic acid units of the copolymer ranges from 0.01 to 10.

14. A process for the salification, in an aqueous medium, of a copolymer obtained from at least one cyclic anhydride-based or carboxylic acid-based monomer and from at least one styrene-based monomer, comprising the step of bringing said copolymer into contact with at least one amine containing at least one nitrogenous heterocyclic group, wherein the amine corresponds to any one of the following formulae (1) to (6):

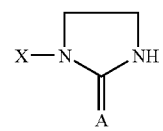
(1)

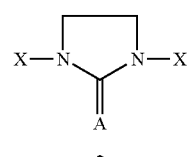
(2)

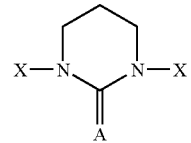
(3)

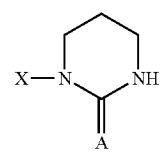
(4)

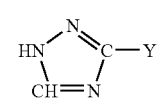
(5)

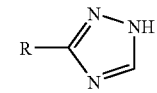
(6)

where A denotes an oxygen or sulphur atom or an NH group,

X denotes a linear or branched $C_1$-$C_{10}$alkylene chain, optionally interrupted with one or more nitrogen atoms, and terminated with a primary or secondary amine function, and Y and R each denote any chain terminated with a primary or secondary amine function, and wherein the salified copolymer comprises nitrogen heterocycles derived from the amine linked to the backbone of the copolymer by ionic bonds.

15. A process for surface-treating paper or cardboard comprising the step of applying a composition comprising the copolymer of claim 1 to one or more surfaces of said paper or cardboard.

16. The copolymer according to claim 8, wherein the molar ratio of the styrene-based monomers to the cyclic anhydride-based or carboxylic acid-based monomers ranges from 0.6:1 to 6:1.

17. The copolymer according to claim 13, wherein the molar ratio of the amine comprising at least one nitrogenous heterocyclic group to the cyclic anhydride or carboxylic acid units of the copolymer ranges from 0.05 to 2.

18. The process of claim of claim 15, wherein said applying involves coating, sizing or finishing said paper or cardboard.

19. A salified copolymer consisting of:
a copolymer obtained from at least one cyclic anhydride-based or carboxylic acid-based monomer and from at least one styrene-based monomer,
the copolymer salified, in an aqueous medium, using only at least one amine comprising at least one nitrogenous heterocyclic group, wherein the at least one amine consists of a formulae (1) to (6):

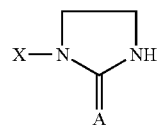  (1)

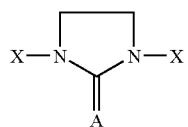  (2)

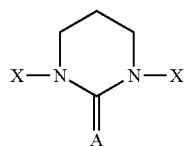  (3)

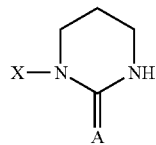  (4)

(5)

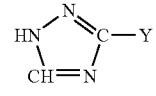  (6)

where A denotes an oxygen or sulphur atom or an NH group, X denotes a linear or branched $C_1$-$C_{10}$ alkylene chain, optionally interrupted with one or more nitrogen atoms, and terminated with a primary or secondary amine function, and Y and R each denote any chain terminated with a primary or secondary amine function, and wherein the salified copolymer comprises nitrogen heterocycles derived from the amine linked to the backbone of the copolymer by ionic bonds.

* * * * *